United States Patent
Kuboyama et al.

(10) Patent No.: US 8,099,280 B2
(45) Date of Patent: Jan. 17, 2012

(54) SPEECH RECOGNITION METHOD AND SPEECH RECOGNITION APPARATUS

(75) Inventors: Hideo Kuboyama, Yokohama (JP); Hiroki Yamamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1345 days.

(21) Appl. No.: 11/475,712

(22) Filed: Jun. 27, 2006

(65) Prior Publication Data

US 2007/0005362 A1 Jan. 4, 2007

(30) Foreign Application Priority Data

Jun. 30, 2005 (JP) .................................. 2005-192199

(51) Int. Cl.
*G10L 15/28* (2006.01)
*G10L 15/04* (2006.01)

(52) U.S. Cl. ........................................ 704/255; 704/254
(58) Field of Classification Search .......... 704/249–250, 704/254–255
See application file for complete search history.

(56) References Cited

U.S. PATENT DOCUMENTS

| 2005/0075876 A1 | 4/2005 | Tsuruta |
| 2005/0256715 A1* | 11/2005 | Okimoto et al. ............... 704/257 |

FOREIGN PATENT DOCUMENTS

| JP | 05-224692 A | 9/1993 |
| JP | 11-045097 A | 2/1999 |
| JP | 2003-208195 A | 7/2003 |

* cited by examiner

*Primary Examiner* — Angela A Armstrong
(74) *Attorney, Agent, or Firm* — Canon USA Inc IP Division

(57) ABSTRACT

A speech recognition method in which, upon speech recognition with use of a model composed of subwords such as triphones depending on a plurality of context, inhibiting hypotheses from extending according to the plurality of contexts so that a processing rate of the speech recognition is increased. In computing a likelihood of an acoustic model referred to upon computation of an accumulated likelihood of a hypothesis through the speech recognition, with respect to each hypothesis, at least one subword model determined depending on its context subwords is referred to, likelihoods of a speech to be recognized and acoustic models of the respective subword models are computed, and the maximum value of the computed likelihoods is set as a likelihood of an acoustic model corresponding to the hypothesis.

4 Claims, 8 Drawing Sheets

TREE STRUCTURE SUBWORD SERIES IN GRAMMAR FOR VOICING

TREE STRUCTURE SUBWORD SERIES ACCORDING TO THE PRESENT INVENTION

S(a, b): LIKELIHOOD OF SUBWORD a IN TURN OF b STATE

USE OF MODELS OF SUBWORDS
INDEPENDENT OF LEFT AND RIGHT CONTEXTS

DEPENDENT ONLY ON
RIGHT CONTEXT

DEPENDENT ONLY ON
LEFT CONTEXT

SPEECH RECOGNITION METHOD AND SPEECH RECOGNITION APPARATUS

BACKGROUND OF THE INVENTION

1. Field of the Invention

The present invention relates to a speech recognition method for recognizing voice.

2. Description of the Related Art

A modeling method using a subword or a triphone smaller than a word is known for speech recognition. Especially, by separating a model such as a triphone depending on its context, a method for separating a model in detail is widely used. An example triphone "SIL−a+k" indicates that, of a sound "a", an immediately preceding sound is "SIL (silent sound) and an immediately following sound is "k". With this, more detail modeling is achieved than that achieved with a phoneme "a", thereby achieving a high recognition rate.

Unfortunately, if a model such as a triphone depending on its context is used, when a plurality of contexts (e.g., word boundaries in continuous word recognition) are present, extending hypotheses corresponding to the number of contexts is needed.

FIG. 5 illustrates likelihood computation with subword series and the corresponding hypotheses according to a recognition grammar allowing repetitive voices of "white (shiro)", "black (kuro)", "chestnut (kuri)", and "red (aka)" to be recognized. A subword 501 shown in FIG. 5A is represented by a triphone composed of a center phoneme and phonemes at left and right context.

The subword 501 is generally modeled through Hidden Markov Model (HMM) having at least one state as shown in FIG. 5B. A hypothesis 502 corresponds to the subword 501 in a state, and, upon likelihood computation, likelihood S (a, b) of each hypothesis is computed. A link 503 links the hypotheses with each other. The likelihood is computed with an output probability of a speech input signal in an HMM state of each hypothesis and a transition probability of the speech input signal transitioning between the states along the links. According to the above-described grammar, the subword 501 depends on a plurality of contexts at the word boundaries of the respective words. Hence, preparing hypotheses corresponding to the number of contexts is needed. More particularly, for left context of subwords (in FIG. 5, "*−sh+i", "*−k+u", "*−k+u", and "*−a+k") at the front ends of the respective words, extending the subwords and the hypotheses is needed, taking account "SIL" and rear-end phonemes "o", "o", "i", and "a" of the respective words. Also, for right context of subwords (in the figure, "r−o+*", "r−o+*", "r−i+*", and "k−a+*") at the rear ends of the respective words, extending the subwords and the hypotheses is needed, taking account "SIL" and front end phonemes "sh", "k", and "a" of the respective words. FIG. 6 illustrates subword series generated through hypothesis extension of word boundaries, according to the above-described method. As seen from the figure, the subwords and the hypotheses expand at the word boundaries, resulting in an increased time needed for computing likelihoods of the hypotheses expanded to such a large extent.

Japanese Patent Laid-Open No. 05-224692 proposes a countermeasure against this problem. That is, by arranging subwords so as to depend only on context within the words, hypothesis extension at the word boundaries is inhibited. FIG. 7A illustrates subword series formed by making use of a phoneme model at the word boundaries, and FIG. 7B illustrates subword series formed by making use of a model depending only either left or right contexts at the word boundaries. While the hypothesis extension as shown in FIG. 6 is inhibited by making use of such models at the word boundaries, use of models less detailed at the word boundaries than in other word areas results in a lower recognition rate. In view of this problem, Japanese Patent Laid-Open No. 11-045097 proposes a method for generating hypotheses by separating word boundaries from the corresponding words as word-to-word words and linking the hypotheses with each other. However, the hypotheses expand still at the word-to-word words, and this method is advantageous only when the word-to-word word is commonly shared by a large number of words. Also, Japanese Patent Laid-Open No. 2003-208195 (corresponding to US Appl. No. 2005-075876) proposes a method for illustrating subwords of words with a tree structure by arranging an internal state of a context dependent model so as to be commonly shared by the words. However, the hypotheses expand in the internal state still depending on the context subwords, resulting in failure in satisfactorily inhibiting the hypothesis extension.

SUMMARY OF THE INVENTION

The present invention is directed to a speech recognition method and a speech recognition apparatus, with which, upon speech recognition with use of a model composed of subwords such as triphones depending on a plurality of context, hypotheses are inhibited from extending according to the plurality of context, as a result, a processing rate of the speech recognition is increased.

In one aspect of the present invention, a speech recognition method includes a reference-step of referring to, in a computation of a likelihood of an acoustic model referred to upon computing an accumulated likelihood of a hypothesis, with respect to each hypothesis, at least one subword model determined depending on its context subwords; and a first likelihood-computation step of computing, based on a speech to be recognized and each of the subword models, likelihoods of acoustic models of the respective subword models, and setting a maximum value of the computed likelihoods as a likelihood of an acoustic model corresponding to the hypothesis.

In another aspect of the present invention, a speech recognition apparatus includes a referring unit configured to refer to, upon computing a likelihood of an acoustic model referred to upon computing an accumulated likelihood of a hypothesis, at least one subword model determined depending on its context subwords with respect to each hypothesis; and a first likelihood-computing unit configured to compute, based on a speech to be recognized and each of the subword models, likelihoods of acoustic models of the respective subword models, and to set a maximum value of the computed likelihoods as a likelihood of an acoustic model corresponding to the hypothesis.

Further features of the present invention will become apparent from the following description of exemplary embodiments with reference to the attached drawings.

DESCRIPTION OF THE EMBODIMENTS

Exemplary embodiments of the present invention will be described with reference to the attached drawings.

First Exemplary Embodiment

Figure 1:
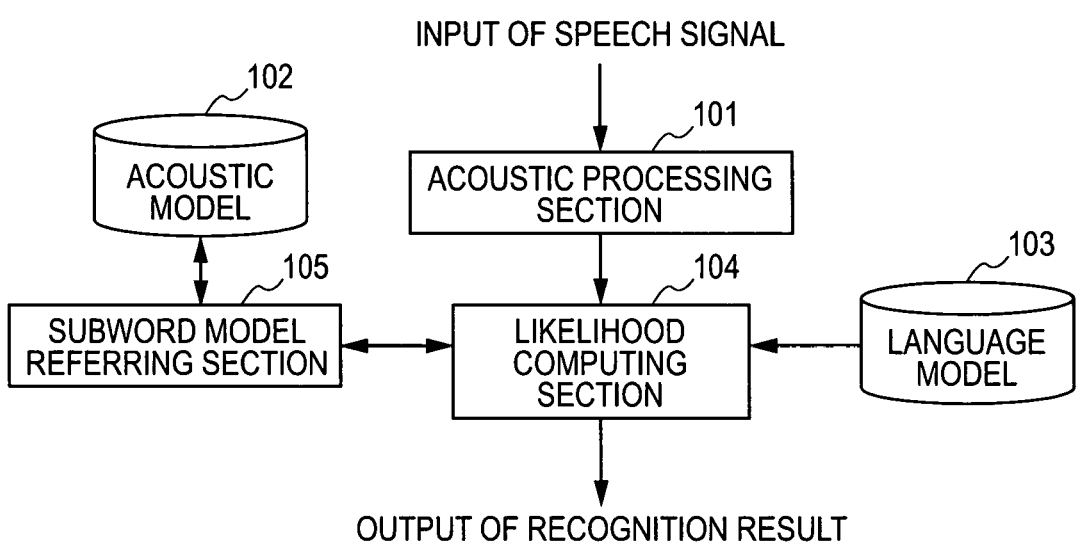
FIG. 1 is a block diagram illustrating the functional configuration of a speech recognition apparatus according to a first embodiment of the present invention.

FIG. 1 is a block diagram illustrating the functional configuration of a speech recognition apparatus according to the first embodiment. The speech recognition apparatus includes a speech/acoustic processing section 101 configured to obtain a speech feature parameter by analyzing an input speech signal; an acoustic model 102 configured to store a subword model in which acoustic features of subwords are modeled through HMM or the like; a language model 103 including recognizable vocabularies, and a grammar or a linkage probability; a likelihood-computing section 104 configured such that, with an input given by the speech feature parameter computed by the speech-processing section 101, on the basis of the acoustic model, the language model hypotheses are generated, and likelihoods of the hypotheses are computed; and a subword-model referring section 105 configured such that, upon likelihood computation performed by the likelihood-computing section 104, at least one subword model determined depending on its context subwords is referred to with respect to each hypothesis.

Figure 2A:
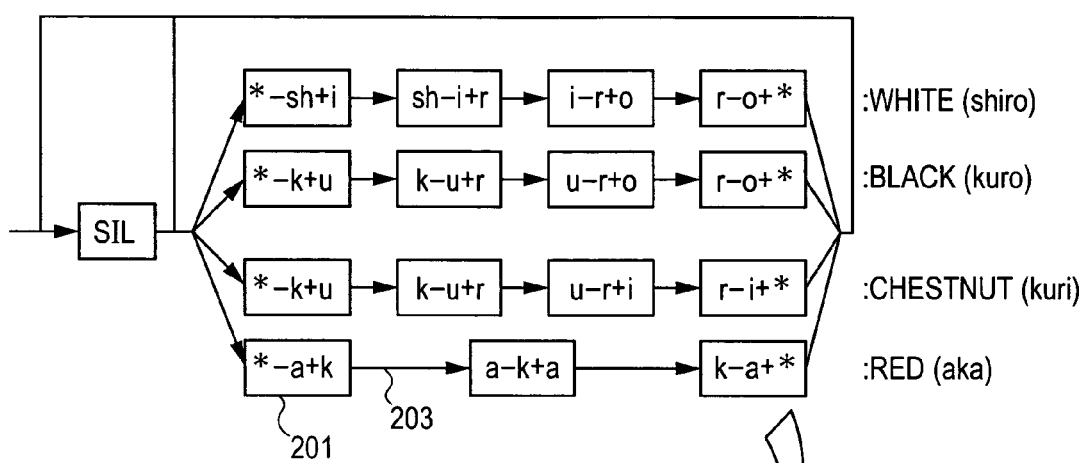
FIGS. 2A and 2B illustrate likelihood computation of subword series generated in the first embodiment and the corresponding hypotheses.
Figure 2B:
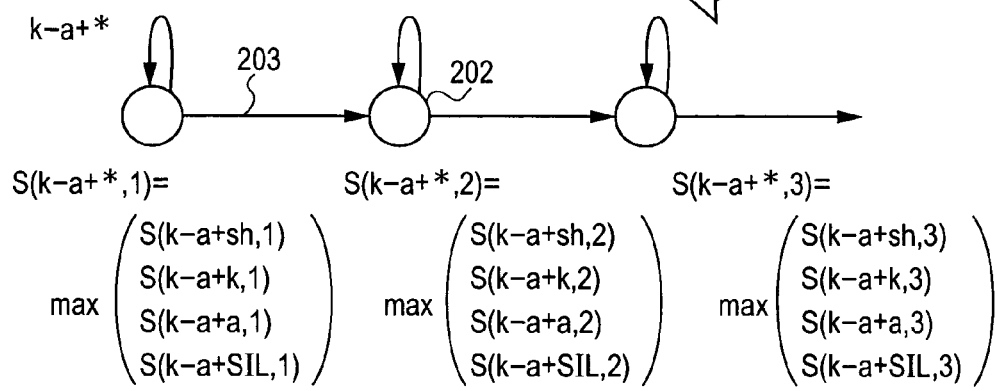

FIGS. 2A and 2B illustrate a manner of the likelihood computation performed by the likelihood-computing section 104 according to the present embodiment. With use of a triphone as a subword dependent on its context, FIG. 2A illustrates subword series according to a recognition grammar allowing repetitive voices of "white (shiro)", "black (kuro)", "chestnut (kuri)", and "red (aka)" to be recognized. A subword 201 is represented by a triphone, which is determined according to a center phoneme and rear and front phonemes in the figure. FIG. 2B illustrates a terminal subword "k–a+*" of a word "red (aka)" in detail. A hypothesis 202 corresponds to a model of the subword 201 in one state. A link 203 links the hypotheses 202 with one another.

Referring back to FIGS. 1, 2A, and 2B, likelihood computation according to the present embodiment will be described. In the present embodiment, the likelihood-computing section 104 has a single subword corresponding to each center phoneme regardless of the number of its context. More particularly, as shown in FIG. 2A, at the terminal end of a word "red (aka)", a series of hypotheses corresponding to a single of "k–a+*" is generated instead of generating subwords and hypotheses respectively corresponding to right context phonemes "SIL", "sh", "k", and "a". Upon performing likelihood computation of the hypotheses, the subword-model referring section 105 refers to subword models on the basis of triphones "k–a+SIL", "k–a+sh", "k–a+k", and "k–a+a" respectively corresponding to the right context phonemes "SIL", "sh", "k", and "a", and state numbers of the hypotheses. On this occasion, a list of subword models corresponding to each hypothesis may be held. Alternatively, a list of hypotheses and subwords models having one-to-one correspondence to each other may be held in a single table or hash so that the subword-model referring section refers to the subword models list with IDs identifying the respective hypotheses. The likelihood-computing section 104 computes likelihoods S (a, b) for the subword models referred to as described above (wherein a and b respectively represent a triphone and a state number). As shown in FIG. 2B, the maximum likelihood is set as a likelihood of an acoustic model of the hypotheses of a subword "k–a+*". By adding an accumulated likelihood of previously computed likelihoods of the hypotheses to the maximum likelihood, an accumulated likelihood of the hypotheses is obtained.

Figure 8:
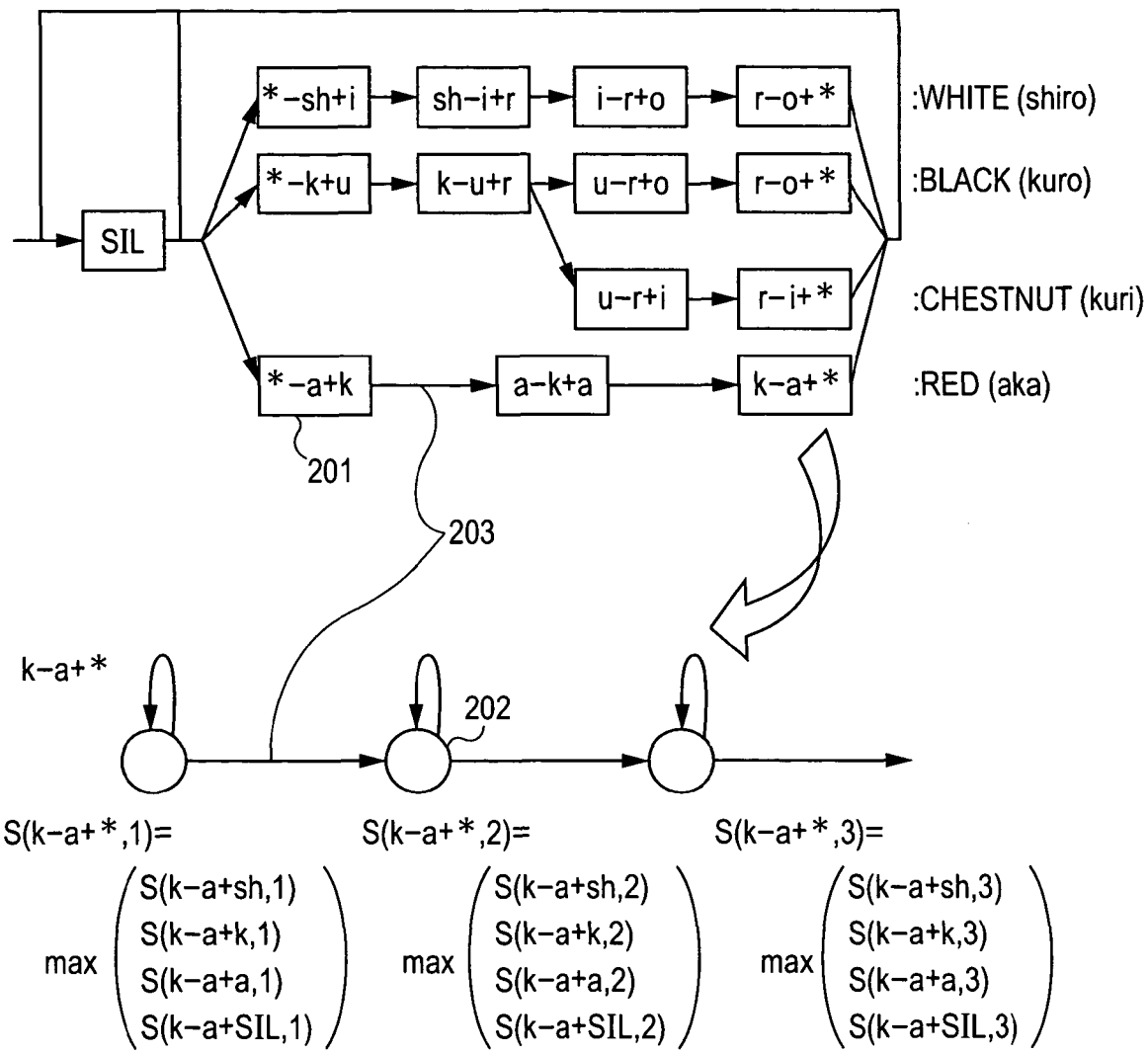
FIG. 8 illustrates likelihood computation of subwords of a tree structure subword series and the corresponding hypotheses generated according to the first embodiment.

The present invention is not limited to a likelihood-computing method in which only subword series are arranged so as to have the same number as that of words to be recognized as shown in FIG. 2A. Even when the present invention is applied to a tree structure shown in FIG. 8, and configured by arranging the top and subsequent subwords of subword series of words so as to be commonly shared by the words (in FIG. 8, subwords "*–k+u" and "k–u+r" are commonly shared by words "black (kuro)" and "chestnut (kuri)"), hypothesis extension at the word boundaries is inhibited in exactly the same manner as performed with the foregoing likelihood-computing method.

With such a configuration, upon speech recognition with use of a model of subwords, each depending on a plurality of its contexts, instead of extending hypotheses for the plurality of contexts, the maximum likelihood of subwords among those corresponding to the plurality of contexts is computed with respect to each hypothesis, thereby inhibiting an increase in the number of hypotheses and increasing the processing rate of speech recognition.

Second Exemplary Embodiment

According to the exemplary first embodiment, expansion of hypotheses of subwords corresponding to a plurality of phoneme context is inhibited. According to the present exemplary embodiment, the number of times of computations of likelihood S (a, b) of a subword model, to which the subword-model referring section 105 refers with respect to each hypothesis, is reduced.

Figure 3:
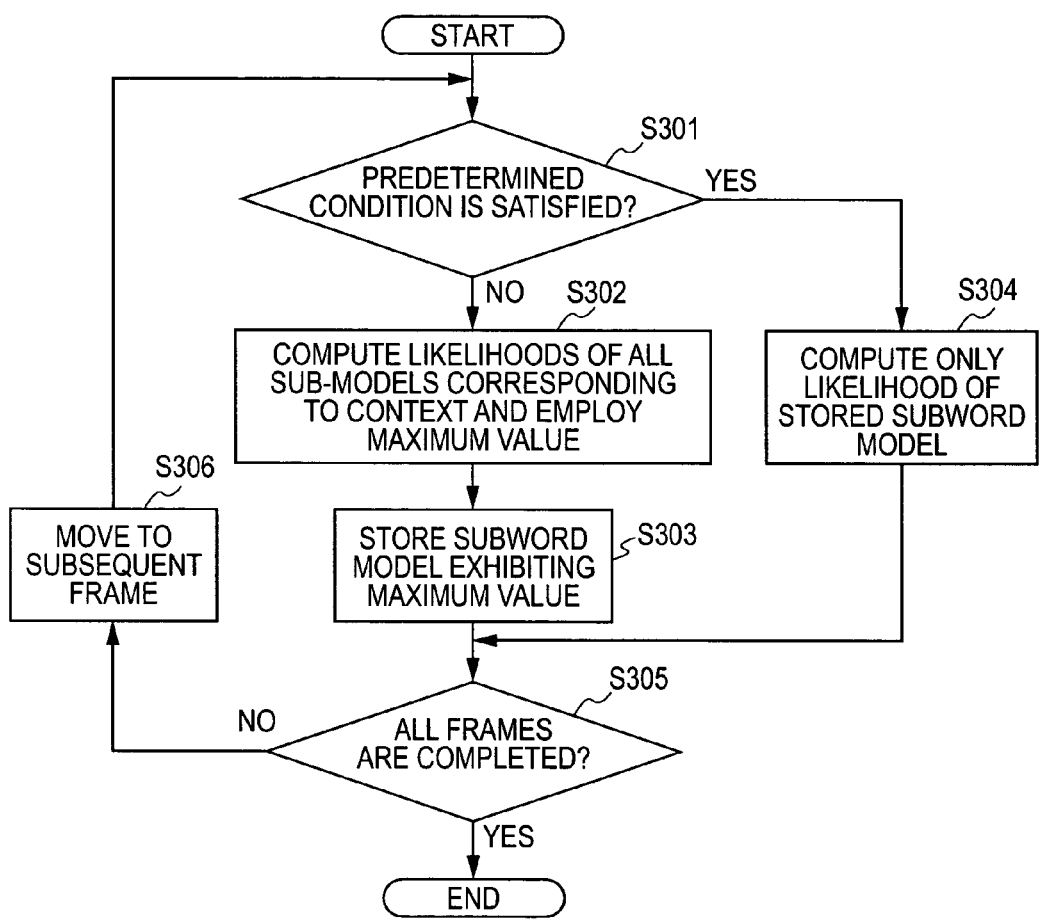
FIG. 3 is a flowchart of a likelihood computation according to a second embodiment of the present invention.

FIG. 3 is a flowchart of the likelihood computation conducted according to the present exemplary embodiment. The following processings are carried out with respect to each hypothesis. A determination is made in step S301 whether a predetermined condition, which will be described below, is satisfied. If the predetermined condition is not satisfied, the process proceeds to step S302. In step S302, likelihoods of all subword models, to which the subword-model referring section 105 referred to, are computed in the same fashion as in the first embodiment, and the maximum value of the computed likelihoods is employed as a likelihood of an acoustic model of the corresponding hypothesis. Then, the process proceeds to step S303. In step S303, a subword model exhibiting the maximum likelihood obtained in step S302 is stored.

A determination is made in step S305 whether likelihood computations of all frames of an input speech signal are completed. If NO, the process proceeds to step S306. In step S306, the likelihood computation is moved to the subsequent frame of the input speech signal. If the predetermined condition is satisfied in step S301, the process proceeds to step S304. In step S304, a likelihood of only the subword model computed in step S303 prior to the present frame of the input speech signal is computed and set as that of the hypothesis 202.

The predetermined condition is given, for example, such that a number frames counted from that having undergone steps S302 and S303 is not greater than a predetermined value or such that a difference between input signals (or between speech feature parameters) of the precedent and the present frames is not greater than a predetermined value. Alternatively, the predetermined conditions may be given by both of them. The present invention is not limited to the above-described ones. That is, a condition capable of supposing that, with respect to a certain hypothesis, subword models exhibiting the maximums are highly likely the same as one another is sufficient to be applicable to the present invention.

With this arrangement, computations for obtaining the maximum values performed in step S302 are approximated by those for obtaining likelihoods of only subword models stored in step S304, thereby reducing the number of times of likelihood computations.

Third Exemplary Embodiment

Figure 4A:
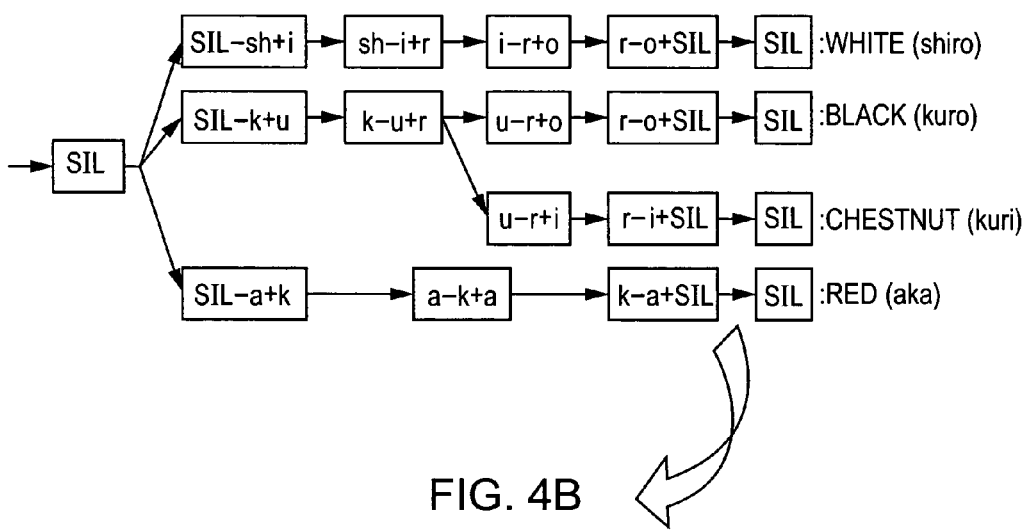
FIGS. 4A and 4B illustrate subword series in a tree structure according to a third embodiment of the present invention.
Figure 4B:
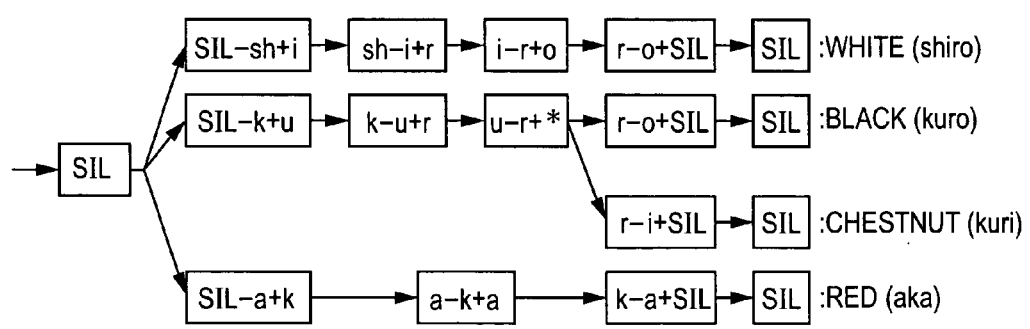
Figure 5A:
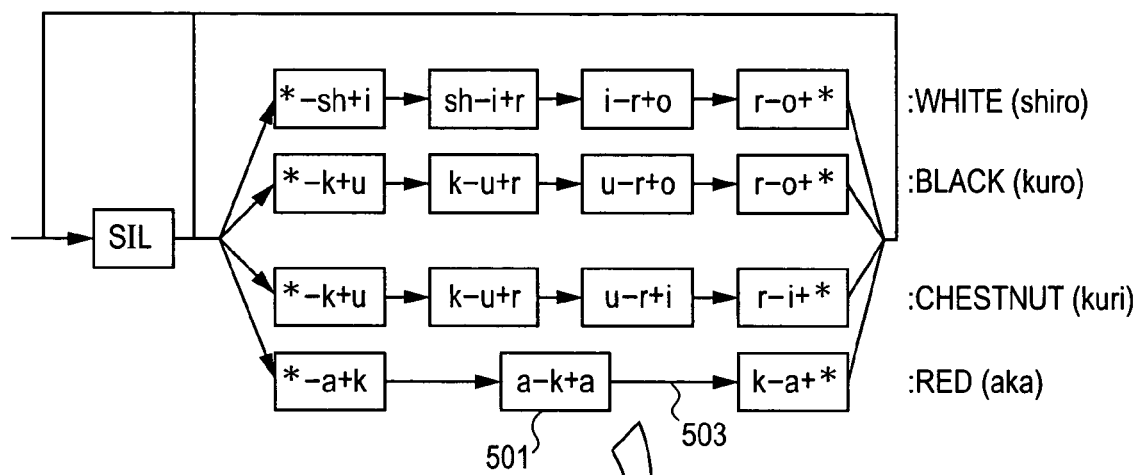
FIGS. 5A and 5B illustrate likelihood computation of subword series and hypotheses generated according to a known method, prior to extension of the hypotheses.
Figure 5B:
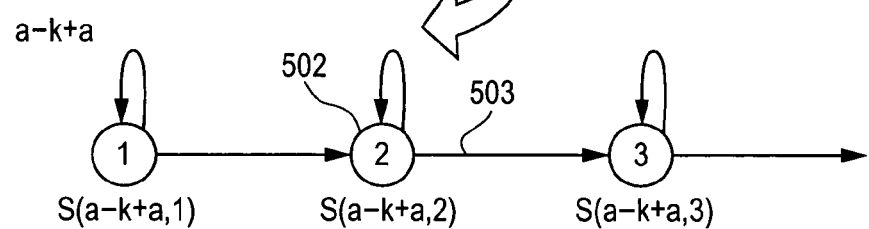
Figure 6:
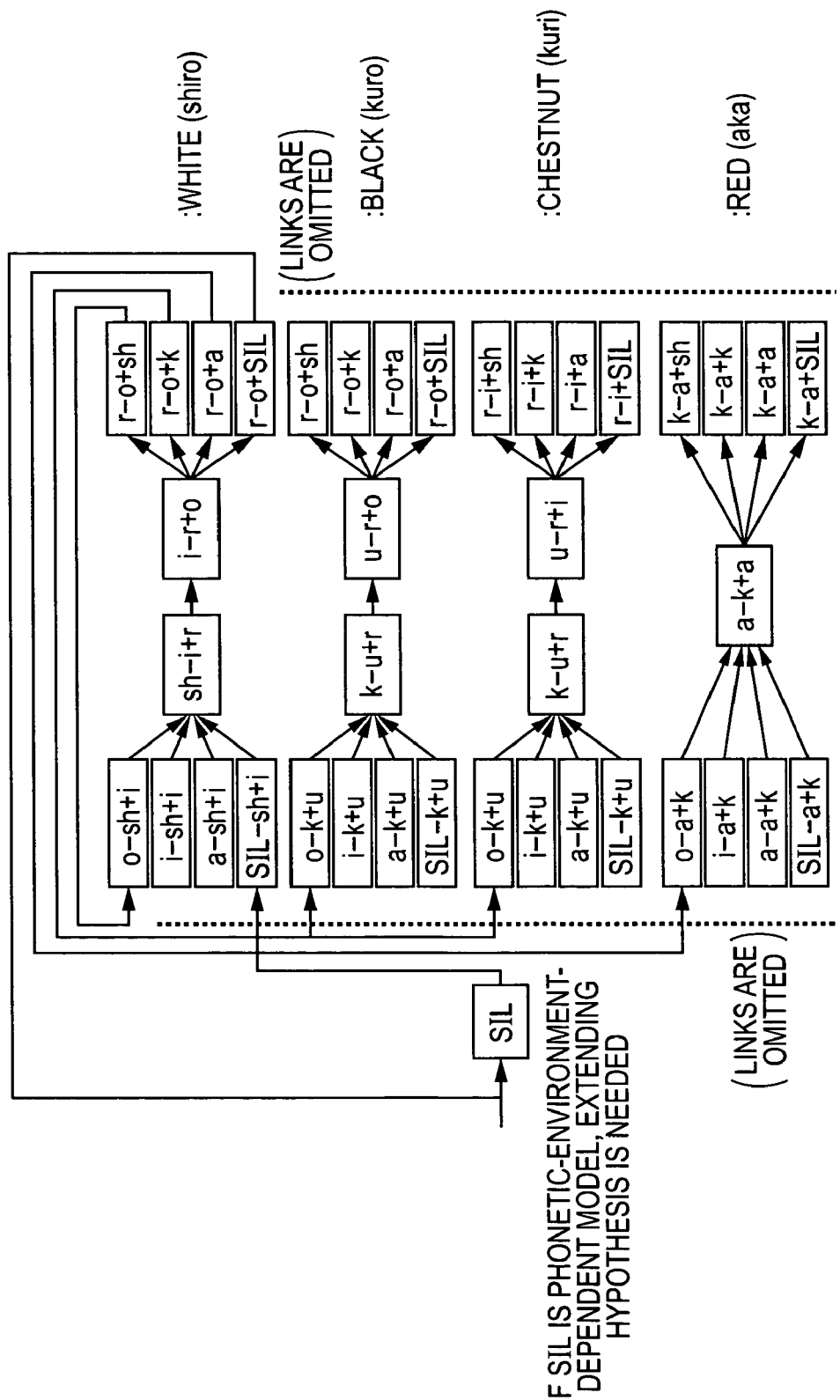
FIG. 6 illustrates subword series generated through hypothesis extension of word boundaries, according to the known method.
Figure 7A:
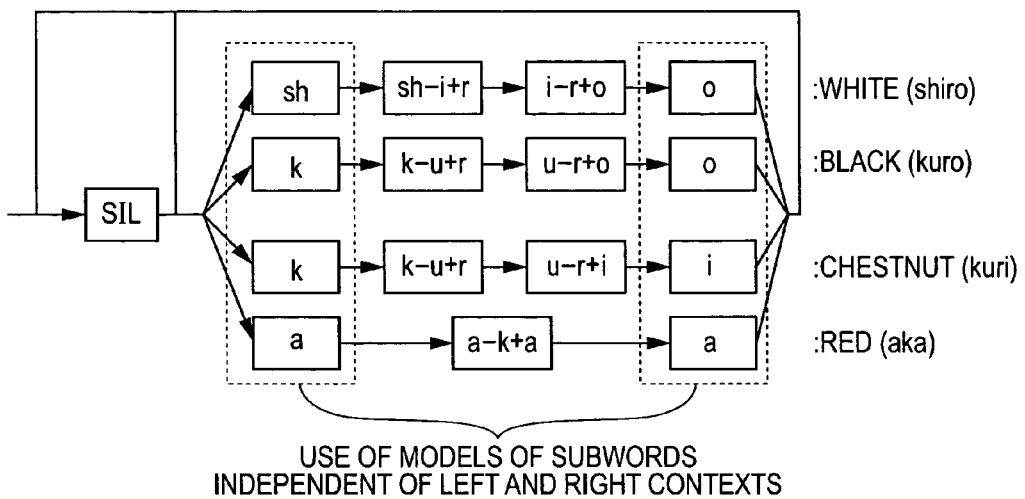
FIGS. 7A and 7B illustrate subwords series composed of subwords depending only on context in a word, according to the known method.
Figure 7B:
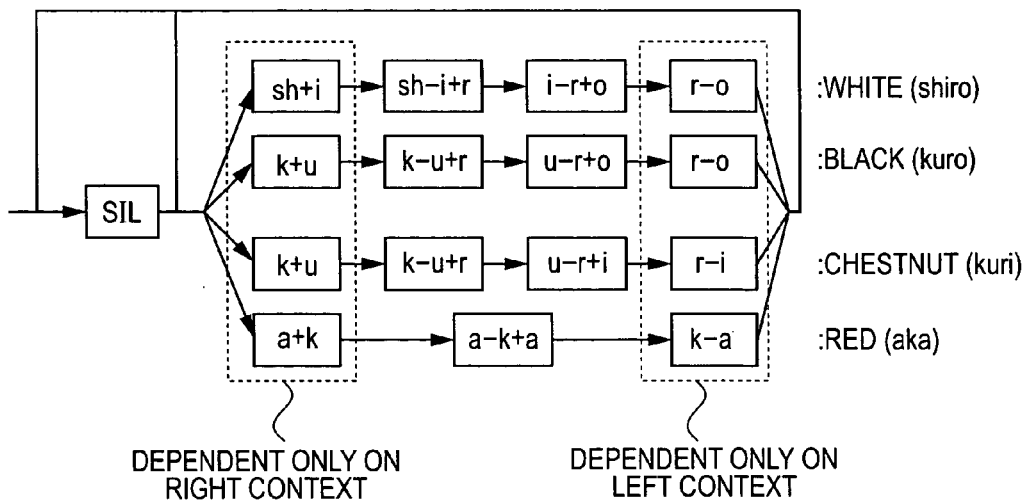

While the foregoing embodiment is described as an exemplary way of inhabiting hypothesis extension of subwords due to word-to-word linkage at the word boundaries for continuous speech recognition, the present invention is not limited to this and is applicable to a hypothesis even within a word, having a plurality of contexts. FIGS. 4A and 4B illustrate subword series, according to a recognition grammar allowing words "white (shiro)", "black (kuro)", "chestnut (kuri)", and "red (aka)" to be independently recognized, in a tree structure in which subwords are commonly shared by some of the words. In FIG. 4A, subwords which are common to some of the words from the tops thereof according to a known tree structure building method are arranged so as to be commonly shared by the words. More particularly, subwords "SIL−k+u" and "k−u+r" are commonly shared by the words "black (kuro)" and "chestnut (kuri)". Upon applying the present invention here, as shown in FIG. 4B, by preparing a subword "u−r+*" so as to be commonly shared by the foregoing two words, and performing the likelihood computation for a hypothesis of this subword as performed in the foregoing embodiment, the number of hypotheses is reduced.

Fourth Exemplary Embodiment

While, in the foregoing embodiments, a triphone is used as a subword depending on its context, the present invention is not limited to such subword and is applicable to a triphone depending only on either the left or right contexts or a subword depending on a variety of contexts other than those depending on the left and right contexts. Also, while in the foregoing embodiments a silent sound model "SIL" which does not depend on its context is illustrated in the figures by way of example, the present invention is not limited to such a model and is likewise applicable to the "SIL" model depending on its context. On that occasion, extension of hypotheses for "SIL" model is inhibited according to the present invention.

Those skilled in the art will appreciate that the sprit of the present invention is also achieved by supplying a storage medium storing a program code of software achieving the functions of the foregoing embodiments to a speech recognition system or the speech recognition apparatus, and by arranging a computer (such as a CPU, or an MPU) of the speech recognition system or the speech recognition apparatus so as to read the program code stored in the storage and execute the program code.

In this case, since the program code read from the storage medium achieves the functions of the foregoing embodiments, the storage medium storing the program code constitutes the present invention.

As a storage medium adapted for supplying the program code, a flexible disk, a hard disk, an optical disk, a magnetic optical disk, a CD-ROM, a CD-R, a magnetic tape, a nonvolatile memory, a ROM, and the like are available.

The present invention is not limited to the case where the functions of the foregoing embodiments are achieved by reading and executing the program code by the computer. One skilled in the art will appreciate that the present invention also includes the case where, for example, an operating system (OS) running on the computer performs a part of or all actual processing according to instructions of the program code so as to achieve the functions of the foregoing embodiments.

In addition, the functions of the embodiments according to the present invention are also achieved such that the program code read from the storage medium is written in a memory provided in a functional extension board inserted in the computer or a functional extension unit connected to the computer, and, according to instructions of the program code, a CPU or the like provided in the functional extension board or the functional extension unit executes a part of all actual processing so as to achieve the functions of the foregoing embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-192199 filed Jun. 30, 2005, which is hereby incorporated by reference herein in its entirety.

What is claimed is:

1. A speech recognition method, comprising the following steps:
   inputting a speech signal;
   using a processor to process the following:
      a reference step of referring to, in a computation of a likelihood of an acoustic model referred to upon computing an accumulated likelihood of a hypothesis, at least one subword model determined depending on its context subwords with respect to each hypothesis;
      a first likelihood-computation step of computing, based on the input speech signal to be recognized and each of the subword models, likelihoods of acoustic models of the respective subword models, and setting a maximum value of the computed likelihoods as a likelihood of an acoustic model corresponding to the hypothesis;
      a storing step of storing the subword model exhibiting the maximum value; and
      if a predetermined condition is satisfied, a second likelihood computation step is performed instead of the first likelihood computation step, the second likelihood computation step including computing a likelihood of the stored subword model and setting the likelihood of the stored subword model as a likelihood of an acoustic model corresponding to the hypothesis, wherein the predetermined condition includes that a time elapsed from the execution of the first likelihood computation step is not longer than a predetermined period and that a difference between an observation signal serving as a target in the first likelihood computation step that is last and a present observation signal is not greater than a predetermined value; and outputting a recognition result based on the process.

2. The speech recognition method according to claim 1, wherein hypotheses for subwords at word boundaries of a word to be recognized refer to a plurality of subword models, depending on context subwords of the word.

3. A speech recognition apparatus, comprising:

an input unit inputting a speech signal;

a processor programmed to control a process of:

a referring unit configured to refer to, upon computing a likelihood of an acoustic model referred to upon computing an accumulated likelihood of a hypothesis, at least one subword model determined depending on its context subwords with respect to each hypothesis;

a first likelihood-computing unit configured to compute, based on the input speech signal to be recognized and each of the subword models, likelihoods of acoustic models of the respective subword models, and to set a maximum value of the computed likelihoods as a likelihood of an acoustic model corresponding to the hypothesis;

a storing unit configured to store the subword model exhibiting a maximum value; and a second likelihood-computing unit configured to compute, if a predetermined condition is satisfied, instead of the first likelihood-computing unit, a likelihood of the stored subword model and to set the likelihood of the stored subword model as a likelihood of an acoustic model corresponding to the hypothesis, wherein the predetermined condition includes that a time elapsed from executing the likelihood computation is not longer than a predetermined period and that a difference between an observation signal serving as a target in the likelihood computation that is last by the first likelihood-computing unit and a present observation signal is not greater than a predetermined value; and an output unit outputting a recognition result based on the process.

4. The speech recognition apparatus according to claim 3, wherein hypotheses for subwords at word boundaries of a word to be recognized refer to a plurality of subword models, depending on context subwords of the word.

* * * * *